United States Patent [19]
Pailler

[11] 4,372,524
[45] Feb. 8, 1983

[54] MOULD FOR PRODUCING PROFILED ELEMENTS OF PLASTICS MATERIAL

[75] Inventor: Jean-Yves Pailler, Sugeres, France
[73] Assignee: Etablissements EVIRA, France
[21] Appl. No.: 287,755
[22] PCT Filed: Dec. 5, 1980
[86] PCT No.: PCT/FR80/00177
  § 371 Date: Jul. 31, 1981
  § 102(e) Date: Jul. 31, 1981
[87] PCT Pub. No.: WO81/01682
  PCT Pub. Date: Jun. 25, 1981

[30] Foreign Application Priority Data

Dec. 6, 1979 [FR] France ............... 79 30006
Nov. 21, 1980 [FR] France ............... 80 24810

[51] Int. Cl.³ .................... B29D 27/04; B29C 6/00
[52] U.S. Cl. ..................... 249/79; 249/95;
            425/121; 264/259; B29C/1/16
[58] Field of Search ............ 425/116, 117, 121, 127,
        425/128, 129 R, DIG. 44, 398; 264/259;
        249/79, 83, 95

[56] References Cited
U.S. PATENT DOCUMENTS

| | | | |
|---|---|---|---|
| 2,916,771 | 12/1959 | Lang et al. | 425/398 |
| 3,087,207 | 4/1963 | Styra | 264/259 X |
| 3,173,175 | 3/1965 | Femelson | 249/79 X |
| 3,836,110 | 9/1974 | Osinsky et al. | 249/79 |
| 4,145,176 | 3/1979 | Nelson | 425/116 X |
| 4,269,586 | 5/1981 | Royayne | 249/79 X |

FOREIGN PATENT DOCUMENTS

| | | |
|---|---|---|
| 2428510 | 1/1976 | Fed. Rep. of Germany |
| 2163540 | 7/1973 | France |
| 2355984 | 6/1976 | France |
| 1131612 | 10/1968 | United Kingdom |
| 1266866 | 3/1972 | United Kingdom |

*Primary Examiner*—J. Howard Flint, Jr.
*Attorney, Agent, or Firm*—Karl W. Flocks

[57] ABSTRACT

A mould for producing profiled elements of plastics material, notably in building joinery frames, comprises upper and lower half-moulds which are separated by a joint plane and respectively associated with tightening means, namely the plates of a press and define together the impression of a profiled element to be moulded from said plastics material. Each of said half-moulds has lateral faces parallel to said profiled element and transverse ends and comprises a shoe having an outer surface including removable fastening means cooperating with said tightening means and an inner surface parallel to said joint plane and forming the bottom of said impression. Interchangeable profile-defining members are respectively fixed to said inner surface and form the sides of said impression, thus permitting the production of a large variety of profiled elements for a very low cost price whilst being easy to produce. Several upper and lower half-moulds may be respectively juxtaposed contiguously in pairs through their straight or mitred transverse ends for the production of frames, or through their lateral faces for the production of panels.

24 Claims, 12 Drawing Figures

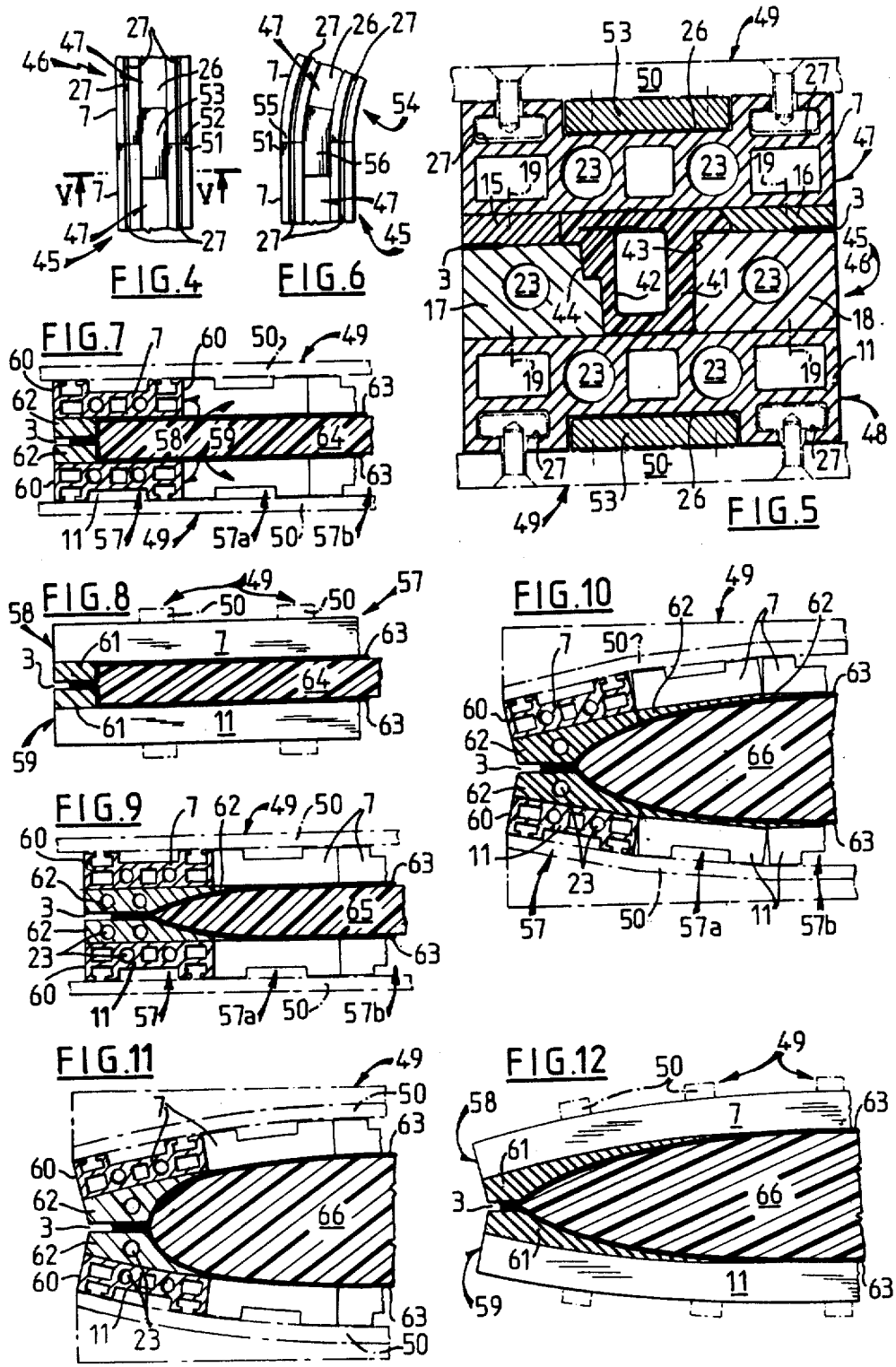

MOULD FOR PRODUCING PROFILED ELEMENTS OF PLASTICS MATERIAL

BACKGROUND OF THE INVENTION

The present invention relates to moulds enabling the production of, for example, profiled elements, panels and frames in building joinery work, of plastics material, notably of polyurethane. The invention also covers the profiled elements and the joinery thus produced.

In the field of moulding plastics materials for the production of profiled elements and of openable or fixed window- and door-frames, joinery work is at present known which is obtained by means of moulds comprising essentially two half-moulds of which each is dimensioned so as to have directly the desired profile and can include extensions for setting to the required length. It is clear that this type of mould is particularly expensive and that the product produced must then be trued, notably at the level of the joints between the extensions.

SUMMARY OF THE INVENTION

It is an object of the present invention to overcome these drawbacks by providing a mould in which the half-moulds do not include extensions and permit the production of a large variety of profiled elements for a very low cost price whilst being easy to produce.

According to the invention, in a mould for producing profiled elements of plastics material, notably of high density polyurethane with a thin construction and integral skin of the type comprising upper and lower half-moulds separated by a joint plane, respectively associated with tightening means such as the tiltable plates of a press and defining together the impression of a profiled element which can include a stiffening core, each half-mould comprises a shoe, whose outer surface includes removable fastening means and whose inner surface is parallel to the joint plane and forms the bottom of the impression, and interchangeable profile-defining members respectively fixed to the inner surface of the shoe on each side of the element to be moulded, the shoes and possibly certain profile-defining members comprising one or several passages for the circulation of a preheating and cooling fluid for keeping the temperature of formation of the moulded material at a substantially constant value.

According to other characteristics:

the shoes and the profile-defining members are constituted by a light alloy and are provided directly by extrusion;

the profile-defining members comprise auxiliary impressions permitting the positioning of metal parts designed to be made fast to the profiled element during moulding, the mould comprising if necessary one or several supplementary interchangeable members, slidable parallel to the joint plane and fixed to lateral jacks;

the removable fastening means associated with the outer surface of each shoe comprise T-grooves formed by extrusion in said outer surface and designed to receive the head of fastening members made fast to the tightening means.

According to a particular embodiment of the invention, a mould designed for the simultaneous production of several profiled elements of the same profile, each having a given length and straight or mitred ends, has a great length and includes terminal parts and separating parts with a cross-section corresponding to that of the impression and with respectively straight or mitred ends.

Also according to the invention, in a composite mould comprising several moulds of the aforesaid type, the upper half-moulds and the lower half-moulds are juxtaposed contiguously in pairs to form respectively an upper composite half-mould and a lower composite half-mould, the removable fastening means associated with the outer surface of each shoe being fixed to an upper or lower mounting frame, made fast to one of the plates of the tightening means and comprising essentially bars arranged transversely with respect to the shoes, the upper and lower half-moulds all having straight or mitred ends.

According to a first possible embodiment, the composite mould comprises two or several moulds of which the constituent half-moulds are respectively juxtaposed contiguously in pairs through their straight or mitred ends by means of a holding device and if necessary anti-flexion devices, each holding device being associated with the contiguous ends of two consecutive half-moulds and comprising a small steel plate, which is fixed to the upper or lower mounting frame and of which each half is arranged in a centering groove obtained by extrusion with the outer surface of the associated shoe, and two lateral support members, which are fixed to said mounting frame opposite the small plate and which bear against the shoes and their interchangeable members, possibly up to the level of the joint plane or beyond, removable stiffening rods being housable in chambers produced by extrusion with the shoes, each antiflexion device being constituted by members made fast to said mounting frame and bearing on each side against the intermediate parts of the half-moulds situated between their ends.

According to other features:

the composite mould can include two or several rectilinear moulds of which the constituent half-moulds are respectively juxtaposed contiguously in pairs through their mitred ends, the small plate of each holding device being in the form of a corner plate and its two lateral support members forming a corner assembly arranged outside of the contiguous ends of the two half-moulds concerned;

the composite mould can include two or several rectilinear moulds of which the constituent half-moulds the respectively juxtaposed contiguously in pairs through their straight ends, the small plate of each holding device being rectilinear and its two lateral support members being rectilinear and arranged on each side of the contiguous ends of the two half-moulds concerned;

the composite mould can include at least one curvilinear mould of which the constituent half-moulds have straight radial ends which are respectively juxtaposed contiguously with the straight transverse ends of the half-moulds constituting the adjacent rectilinear moulds, the shoes and the interchangeable profile-defining members of the two half-moulds of each curvilinear mould being bent, notably into a semi-circle, in a plane corresponding to the joint plane or parallel to the latter, the small plate forming part of each holding device being half-rectilinear and half-curvilinear.

According to a second possible embodiment, the composite mould includes several rectilinear moulds of which the constituent half-moulds are respectively juxtaposed contiguously in pairs through their lateral surfaces, lateral jacks being fixed to each mounting frame and associated with the outer lateral surfaces of the two half-moulds situated laterally most outwardly, each composite half-mould thus formed including terminal parts and profile-defining members fixed to the inner surface of the shoes, a layer or sheet of light alloy being attached to the inner surface of each composite half-mould.

According to other features of the above composite mould:

the half-moulds can be longitudinally bent;
the half-moulds can be transversely bent.

BRIEF DESCRIPTION OF THE DRAWINGS

Other characteristics and advantages of the present invention will become more apparent from the description which follows, given with reference to the accompanying drawings in which:

FIG. 4 shows a view from above of a part of a composite mould including two rectilinear moulds juxtaposed through their straight ends, the bars of the mounting frames having been removed;

FIG. 5 shows a cross-sectional view along the line V—V of FIG. 1;

FIG. 6 shows a view identical with that of FIG. 4, the composite mould including a rectilinear mould and a curvilinear mould;

FIG. 7 shows a partial cross-sectional view of a composite mould including several rectilinear moulds juxtaposed through their lateral surfaces;

FIG. 8 shows a partial lateral view of the composite mould known in FIG. 7;

FIG. 9 shows a view identical with that of FIG. 7, the profile-defining members being modified in order to produce an element with a convex profile;

FIG. 10 shows a view identical with that of FIGS. 7 and 9, the bars of the mounting frames being angularly bent;

FIG. 11 shows a view identical with that of FIGS. 7, 9 and 10, the moulds being bent transversely; and FIG. 12 shows a view identical with that of FIG. 8, the moulds being bent longitudinally.

In the drawings, the same reference numerals denote the same elements.

DESCRIPTION OF THE PREFERRED EMBODIMENTS

Figure 1:
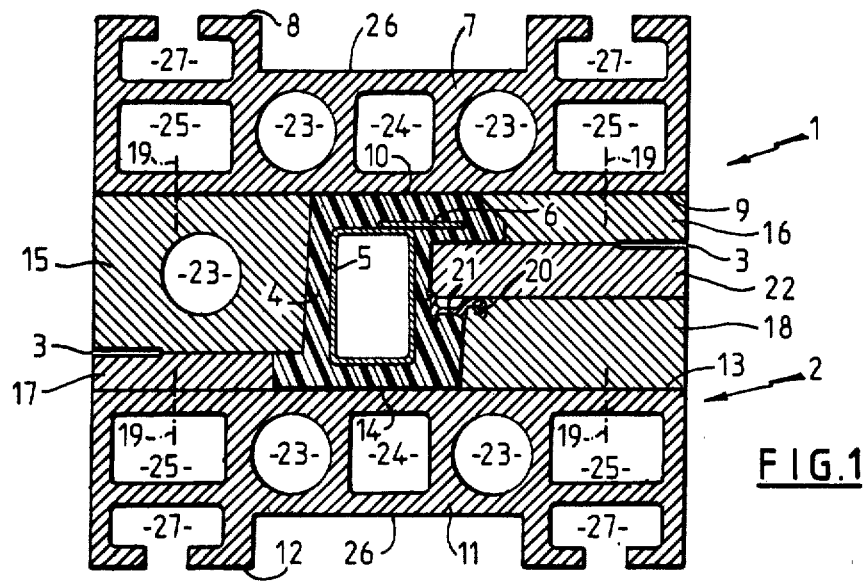
FIG. 1 shows a cross-sectional view of the essential parts of a mould for profiled elements according to the invention.

Referring to FIG. 1, a mould according to the invention is of the type comprising upper and lower half-moulds, denoted as a whole by 1 and by 2 and separated by the joint plane 3. These two half-moulds are respectively associated with tightening means such as the plates of a press, which are not shown in the drawings and which are preferably tiltable and orientable. During tightening, the half-moulds 1 and 2 define together the impression of a generally elongated profiled element, which is denoted by 4 and which can include a stiffening core 5. This stiffening core is prefebably hollow and constituted by steel and, as a function of the profile provided for the moulded element 4, it can include one or several built-on wings 6.

The various profiled elements which can be produced according to the invention are constituted by a moulded plastics material, preferably a high density polyurethane with a thin construction and integral skin, as will be explained in more detail below.

According to the invention, the upper half-mould 1 comprises a shoe 7 of which the outer surface 8 includes removable fastening means, which will be detailed with reference to FIG. 2, and whose inner surface 9 is parallel to the joint plane 3 and forms the upper bottom of the impression, that is to say the upper surface 10 of the moulded element 4. In the same way, the lower half-mould comprises a shoe 11 whose outer surface 12 includes removable fastening means and whose inner surface 13 is parallel to the joint plane 3 and forms the lower bottom of the impression, that is to say the lower surface 14 of the moulded element 4.

In addition, interchangeable profile-defining members are respectively fixed to the inner surface 9 or 13 of each of the shoes 7 and 11, on each side of the element 4 to be moulded. By way of example, profile-defining members 15 and 16 are fixed to the inner surface 9 of the upper shoe 7, whilst members 17 and 18 are fixed to the inner surface 13 of the lower shoe 11. Due to the fact that all these profile-defining members are interchangeable according to the profile that it is desired to produce for the moulded element, they are fixed to their respective shoes, preferably by screws shown in mixed lines 19, as will be explained in more detail with reference to FIG. 2.

It is to be noted that the facing interchangeable members, belonging to two half-moulds, such as the members 15 and 17, form the joint plane 3 whilst defining the sides of the impression. When this is necessary, the profile-defining members can include auxiliary impressions enabling the positioning of metal parts designed to be made fast to the profiled element during moulding, notably hinges and casement bolt elements in the case of a profiled element forming part of a building joinery frame. By way of example, the interchangeable member 18 includes an auxiliary impression 20 enabling the positioning of a seal holder 21, which may be a profiled element of light alloy, the profiled element 4 can then be the sill of a fixed frame.

In the foregoing case, the mould can comprise one or several supplementary interchangeable members, such as the member 22, designed both to define a part of the sides of the impression and to hold the one or more metallic parts in place before and during moulding. To permit unmoulding, it is generally necessary for each supplementary member to be slidable parallel to the joint plane and be fixed to lateral jacks (not shown), belonging, for example, to the previously mentioned press. Preferably, a supplementary member such as the member 22 is associated with the lower half-mould 2 and its upper surface forms the joint plane with the facing member belonging to the upper half-mould 1.

According to an essential feature of the invention, the shoes 7 and 11 and possibly certain profile-defining members, such as the relatively bulky member 15, include one or several passages 23 for the flow of a preheating and cooling fluid intended to keep the formation temperature of the moulded material at a substantially constant value. In the case of polyurethane, it is known that the formation of the moulded material is accompanied by an exothermic reaction reaching about 180° C. and that the thickness of the skin is a function of the temperature at which the mould is maintained. Under these conditions, it is generally preferred to preheat the mould to a temperature of the order of 55° C. before injecting the components of the polyurethane and this temperature is kept substantially constant during the whole operation of moulding and forming the moulded element.

In other respects, it is possible to treat the stiffening core 5 with a binding product designed to avoid the unsticking of the polyurethane with respect to steel, taking into account differences in the coefficient of expansion of these two materials.

According to another feature of the invention, the shoes 1 and 2 as well as the profile-defining members, such as the members 15 to 18 and 22, are constituted by a light alloy enabling rapid heat exchange, for example "duralumin," and are formed directly from extrusion. Taking into account the mechanical strength of the dies and the weight of the shoes, each of the latter is extruded so as to include preferably a central chamber 24 and two lateral chambers 25 respectively framing two passages 23. In addition, the outer surface 8 or 12 of each of the shoes 1 and 2 has preferably a rectangular centering groove 26 and two lateral T-shaped grooves 27, which constitute the previously mentioned removable fastening means and are designed to receive the head of fixing members made fast to tightening means such as the plates of a press. However, the finality of these various chambers and grooves produced directly by extrusion will be better understood below with reference to FIG. 2.

In general, due to the fact that all the essential parts of the mould according to the invention are manufactured by extrusion, it is possible to obtain moulds of great length and, consequently, profiled elements having themselves a considerable length, and the latter can then be cut up if necessary.

However, the mould described until now with reference to FIG. 1 is preferably designed for the simultaneous production of several elongated profiled elements of the same profile, each having a given length and straight or mitred ends. In this case, the mould according to the invention has a great length and includes terminal parts and separating parts, not shown, with a cross-section corresponding to that of the impression and with respectively straight or mitred ends. The profiled elements so-obtained can be assembled with other profiled elements having respectively profiles suitable for forming the external joinery of buildings, notably fixed frames. It is clear that these other profiled elements are formed by means of a mould according to the invention in which the interchangeable profile defining members have been replaced according to the desired profiles.

In another embodiment of the invention, it is possible to assemble four moulds of the previously described type, so as to obtain a composite mould designed for the simultaneous production of four profiled elements with identical or different profiles forming a one-piece rectangular frame, for example, a movable frame, usable directly in the external joinery work of a building. In this case, the four upper half-moulds and the four lower half-moulds have preferably mitred ends and are assembled in pairs by means of holding devices and if necessary antiflexion devices so that, taking into account the length of the half-moulds, the respective mitred joints are rendered hermetic under the effect of expansion at moulding temperature.

Figure 2:
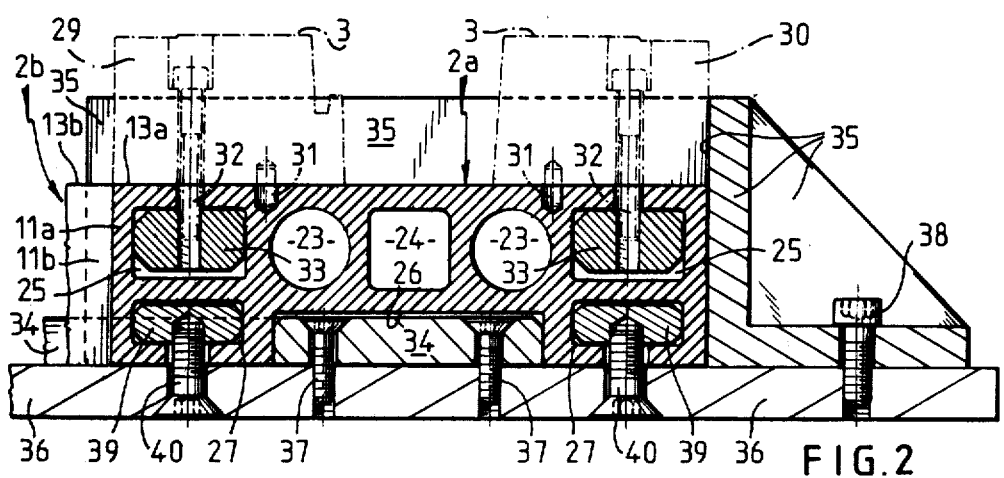
FIG. 2 shows a view in partially broken section of an angular portion of a composite half-mould for a one-piece joinery frame according to the invention.
Figure 3:
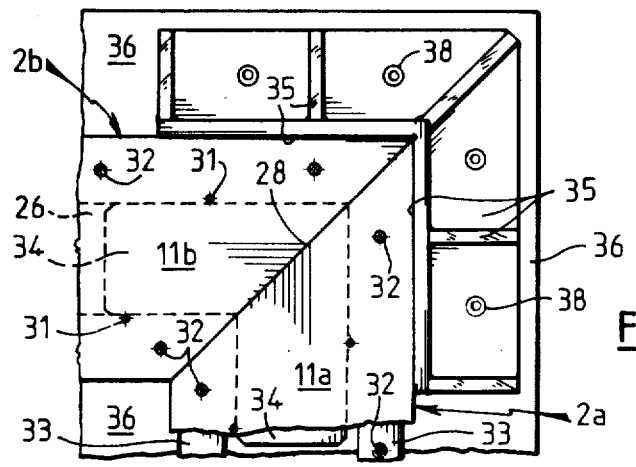
FIG. 3 shows a view from above of the essential elements of the angular portion corresponding to the section seen in FIG. 2.

With reference to FIGS. 2 and 3, an angular part of a lower composite half-mould according to the invention comprises two lower half-moulds 2a and 2b assembled along a mitred joint plane 28. These half-moulds evidently comprise respective shoes 11a and 11b, which are identical with the previously described shoes, and associated profile-defining members 29 and 30, which have been removed in FIG. 3 and are shown diagrammatically in FIG. 2. It is to be noted that these interchangeable members 29 and 30, which have a profile corresponding to that of the desired profiled element, define a joint plane 3 parallel to the upper surface 13a, 13b of the respective shoes, as previously described with reference to FIG. 1.

Preferably, the exact position of the interchangeable members 29 and 30 with respect to their associated shoe 11a is determined by means of centering pins 31. The members 29 and 30 are fixed to said shoe 11a by means of screws 32 passing through them, of which the head is buried in the associated member and whose threaded portion is screwed, either directly into the shoe, or preferably into a stiffening rod or flat 33 housed in the chamber 25.

As previously indicated, the half-moulds so-obtained are assembled in pairs by means of holding devices. According to the invention, each holding device comprises essentially a centering member such as a small steel corner plate 34, of which each of the two legs is housed in the rectangular groove 26 of one of the shoes, and a corner assembly 35 designed to hold said shoes and fixed to the tightening means.

The corner assembly 35 can be of the mechano-welded type with stiffening brackets and ribs and it is in principle positioned outside the half-moulds concerned 2a and 2b, so as to bear at the same time against the shoes 11a and 11b and against their interchangeable members 29 and 30, if necessary up to the level of their joint plane 3 or beyond.

To facilitate the assembly on tightening means such as the plates of a press, it may be arranged to mount each composite half-mould on a mounting frame such as a mounting plate 36 before rendering the latter fast to one of the plates of the press. In this case, the small centering corner plate 34 and the corner assembly 35 can be respectively fixed to the mounting plate 36 by means of screws 37 and 38. In addition, it is possible to mount stiffening and fastening rods or flats 39 in the T-grooves 27 and to hold them by means of screws 40 passing through the mounting plate 36.

Due to the fact that the four half-moulds thus mounted can have considerable lengths and that their ends are held as previously indicated, their intermediate parts are liable to be deformed under the effect of expansion. In this case, it is possible to use flats or small plates embedded in the rectangular groove 26 as well as anti-flexion devices, not shown, constituted by members made fast to tightening means or the mounting frame formed by the mounting plate 36 and bearing on each side against the intermediate parts of the half-moulds. In addition, it is possible to mount the holding devices and the possible anti-flexion devices when the temperature of the mould unit is at least 40° C., which permits excessive deformations under the effect of expansion at normal working temperature, to be avoided.

In this respect, the preheating and cooling system can be connected and controlled separately for each of the half-moulds concerned so as to take into account better the relative masses of the material during the moulding and of the light alloy in order that a more uniform temperature for the whole of the composite mould may be obtained.

When a press with tiltable and orientable plates is used, the injection orifice is obviously positioned at the lowest level and the vent hole at the highest level, the angle of the mould with respect to the horizontal being generally of the order of 60°.

According to the foregoing, the use of a composite mould as described enables the production of a one-piece rectangular frame with profiled elements which is directly usable in external building joinery by means of simple trimming of the mitred joint planes, which has to be done only at the level of the upper and lower surfaces 10 and 14 of the frame so-obtained.

However, the previously described composite mould only constitutes one particular case in which the constituent half-moulds are all juxtaposed contiguously in pairs through their mitred ends whilst the half-moulds according to the invention can equally be juxtaposed in pairs through their straight ends or through their lateral surfaces.

In this respect, with reference to FIGS. 4 and 5, a composite mould according to the invention can be designed for the production of a profiled element of a building joinery work frame, such as a stile or a post 41 including a stiffening core 42 and having an inner fillister 43 and a double outer fillister 44. As has already been indicated, the composite mould is of the type comprising several rectilinear moulds, such as moulds 45 and 46, each constituted by an upper half-mould 47 and by a lower half-mould 48.

In such a composite mould according to the invention, the upper half-moulds and the lower half-moulds all have straight ends and are juxtaposed contiguously in pairs to form respectively an upper composite half mould and a lower composite half-mould. In addition, removable fastening means associated with the outer surface of each shoe 7 or 11 are fastened to an upper or lower mounting frame 49 which is made fast to one of the plates of the tightening means and which comprises essentially bars 50 arranged transversely with respect to the shoes 7 and 11 and advantageously replacing the aforesaid plate 36.

According to a first possible embodiment, the composite mould comprises two or several rectilinear moulds, such as moulds 45 and 46, of which the constituent half-moulds 47 or 48 are respectively juxtaposed contiguously in pairs through their straight ends 51, 52. A holding device is associated with the contiguous ends 51, 52 of two consecutive half-moulds and comprises a small rectilinear centering plate 53 which is fixed to the upper or lower mounting frame 49 and of which each half is positioned in the groove 26 obtained by extrusion with the outer surface of the associated shoe 7 or 11.

Preferably, each holding device comprises in addition, at the level of the small plate 53, lateral support members such as stiffening brackets and ribs fixed to the mounting frame and bearing against the lateral surfaces of the shoes and of the profile defining members. These brackets which are not shown, can be substantially identical with the brackets and ribs described with reference to the corner assembly 35 shown in FIGS. 2 and 3.

As a modification, referring to FIG. 6, the composite mould according to the invention includes at least one curvilinear mould 54 of which the constituent half-moulds have straight radial ends 55 which are respectively juxtaposed contiguously with the straight transverse ends 51 or 52 of the half-moulds constituting the adjacent rectilinear moulds 45 or 46. In such a curvilinear mould, the shoes 7 and 11 and the interchangeable profile-defining members 15 to 18 of the two half-moulds are bent, notably into a semi-circle, in a plane corresponding to the joint plane 3 or parallel to the latter. The small plate 56 forming part of each holding device is preferably half-rectilinear and half-curvilinear. It is clear that it is possible thus to produce building joinery frames, notably of external joinery work, comprising for example an upper arcuate rail.

It is also obvious that the composite mould could include several curvilinear moulds juxtaposed contiguously in pairs through their ends, thus enabling the production of other configurations of frames.

With reference to FIGS. 7 to 12, according to a second possible embodiment, the composite mould comprises several rectilinear moulds 57, 57a, 57b, etc., of which the constituent half-moulds 58, 59 are respectively juxtaposed contiguously in pairs through their lateral surfaces 60. Lateral jacks (not shown) are preferably fixed to each mounting frame 49 and bear on the outer lateral surfaces 60 of the two half-moulds situated laterally most outwardly. Each composite half-mould thus formed comprises terminal parts 61 and profile-defining members 62 which are fixed to the inner surface of the shoes 7 and 11. In addition, a layer or sheet 63 of light alloy is possibly attached to the inner surface of each composite half-mould.

More precisely, with reference to FIGS. 7 and 8, the composite mould according to the invention enables the production of a plate or a panel 64 having for example a constant thickness. In this case, the half-moulds are juxtaposed in a plane parallel to the joint plane 3 and, preferably, only the shoes 7, 11 of the half-moulds situated most outwardly include profile defining members 62. It is obvious that the thickness and the shape of the terminal parts 61 and of the members 62 enables the cross-sectional profile of the panel to be determined, and the latter can for example have a thinned or reinforced peripheral edge and, if necessary, one or several peripheral mouldings. It is to be noted also that instead of being mounted in the fillister of a frame produced separately, such a panel can be moulded in a single part with the profiled elements of the frame so as to form a joinery work which can be used directly.

A composite mould according to the invention also enables the production of plates or panels having a bulging surface and a flat or concave surface. Notably, by way of example and with reference to FIG. 9, such a composite mould enables the production of a panel 65 of which the two surfaces are convex.

Referring to FIG. 10, in the case where the plate or the panel contemplated 66 is relatively thick, it is possible to modify the mounting frame 49 so that the transverse bars 50 are slightly bent from place to place so that the shoes 7, 11 may be juxtaposed on the inner edge of their lateral surfaces 60. Under these conditions, it is possible to mould, for example, a plate 66 of the windsurf type whose keel, mast socket and, possibly, other superstructure holders are inserted before moulding.

As a modification, with reference to FIGS. 11 and 12, the composite mould according to the invention can obviously include longitudinally and/or transversely bent half-moulds, the transverse bars 50 of the upper and lower mounting frames 49 can then be bent or shaped into a circular arc.

Generally, terminal parts 61 and profile defining members 62 having a considerable thickness can include, like the shoes 7, 11, passages 23 intended for the flow of a pre-heating and cooling fluid. As mentioned above, all these passages 23 are preferably connected to a single circuit, so that it is easy to maintain the formation temperature of the moulded material at a substantially constant value, enabling thus the production of a product having the best properties.

It is of course well understood that the present invention has only been described and shown purely by way of illustration, which is in no way limiting, and that it would be possible to introduce therein any useful modification, notably within the field of technical equivalents, without departing from its scope.

What is claimed is:

1. Mould for producing elongated profiled elements of plastics material, notably of high density polyurethane with a thin construction and integral skin, comprising:
    an upper half-mould and a lower half-mould, said two half-moulds being separated by a joint plane and each having lateral faces parallel to said elongated element and transverse ends;
    said half-moulds being respectively associated with tightening means and defining together the impression of a profiled element to be moulded from said plastics material;
    each of said half-moulds comprising a shoe having an outer surface and an inner surface;
    said outer surface including removable fastening means cooperating with said tightening means;
    said inner surface being parallel to said joint plane and forming the bottom of said impression;
    interchangeable profile-defining members respectively fixed to said inner surface and forming the sides of said impression;
    at least one passage in said shoe for the circulation of a fluid for maintaining the temperature of formation of said plastics material at a substantially constant value.

2. Mould according to claim 1, wherein said tightening means are constituted by the plates of a press.

3. Mould according to claim 1, wherein said interchangeable profile-defining members include a passage for the circulation of said fluid for maintaining the temperature of formation of said plastics material at a substantially constant value.

4. Mould according to claim 1, wherein said shoes and said profile-defining members are constituted by a light alloy and are provided directly by extrusion.

5. Mould according to claim 1, wherein said profile-defining members include auxiliary impressions permitting the positioning of metal parts designed to be made fast to the profiled element during moulding thereof, said mould further comprising at least one supplementary interchangeable member, slidable parallel to said joint plane and fixed to lateral jacks.

6. Mould according to claim 1, wherein said removable fastening means associated with said outer surface of said shoe comprise T-grooves formed by extrusion in said outer surface and designed to receive the head of fastening members made fast to said tightening means.

7. Mould according to claim 1, further comprising straight transverse terminal and separating parts having a cross-section corresponding to that of said impression.

8. Mould according to claim 1, further comprising mitred transverse terminal and separating parts having a cross section corresponding to that of said impression.

9. Composite mould constituted by a plurality of contiguously juxtaposed elementary moulds, comprising:
    an upper assembly of juxtaposed half-moulds and a lower assembly of juxtaposed half-moulds;
    said two assemblies being separated by a joint plane and respectively associated with tightening means and defining together the impression of a profiled element to be moulded from said plastics material;
    each of said elementary moulds from said plurality comprising two half-moulds each having lateral faces and transverse ends and comprising a shoe having an outer surface and an inner surface;
    said outer surface including removable fastening means associated with a mounting frame;
    said frame comprising bars arranged transversely with respect to the plurality of shoes and associated with said tightening means;
    said inner surface being parallel to said joint plane and forming the bottom of said impression;
    interchangeable profile-defining members respectively fixed to said inner surface and forming the sides of said impression;
    at least one passage in said shoe for the circulation of a fluid for maintaining the temperature of formation of said material at a substantially constant value.

10. Composite mould according to claim 9, wherein said tightening means are constituted by the plates of a press.

11. Composite mould according to claim 9, wherein said interchangeable profile-defining members include a passage for the circulation of said fluid for maintaining the temperature of formation of said plastics material at a substantially constant value.

12. Composite mould according to claim 9, wherein said shoes and said profile-defining members are constituted by a light alloy and are provided directly by extrusion.

13. Composite mould according to claim 9, wherein said removable fastening means associated with said outer surface of said shoe comprise T-grooves formed by extrusion in said outer surface and designed to receive the head of fastening members made fast to said bars of said mounting frame.

14. Composite mould according to claim 9, wherein said transverse ends of said half-moulds are straight.

15. Composite mould according to claim 9, wherein said transverse ends of said half-moulds are mitred.

16. Composite mould according to claim 9, wherein said outer surface of said shoe comprises a rectangular centering groove formed by extrusion in said outer surface and designed to receive a small holding plate made fast to said bars of said mounting frame.

17. Composite mould according to claim 9, wherein said mounting frames further comprise lateral support members which bear against said lateral faces of said shoe and said associated profile-defining members.

18. Composite mould according to claim 9, wherein said elementary moulds are rectilinear.

19. Composite mould according to claim 9, wherein said elementary moulds are curvilinear.

20. Composite mould according to claim 9, wherein said upper half-moulds and said lower half-moulds are respectively juxtaposed contiguously in pairs through their transverse ends.

21. Composite mould according to claim 9, comprising straight transverse terminal parts having a cross-section corresponding to that of said impression.

22. Composite mould according to claim 9, wherein the upper half-moulds and the lower half-moulds are respectively juxtaposed contiguously in pairs through their lateral faces, a layer or sheet of light alloy being attached to the inner surface of each respective assembly of juxtaposed half-moulds.

23. Composite mould according to claim 9, wherein said half-moulds are bent longitudinally.

24. Composite mould according to claim 9, wherein said half-moulds are bent transversely.

* * * * *